Oct. 15, 1929.  C. P. EISENHAUER  1,731,770
PUMP
Filed Dec. 11, 1926   3 Sheets-Sheet 3
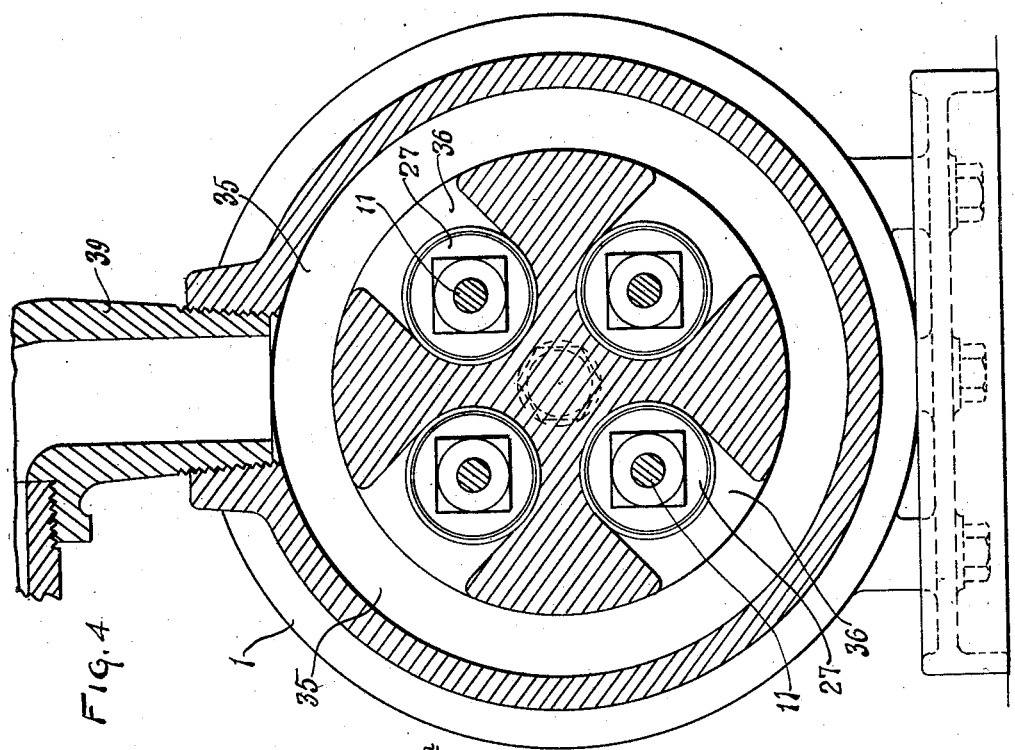
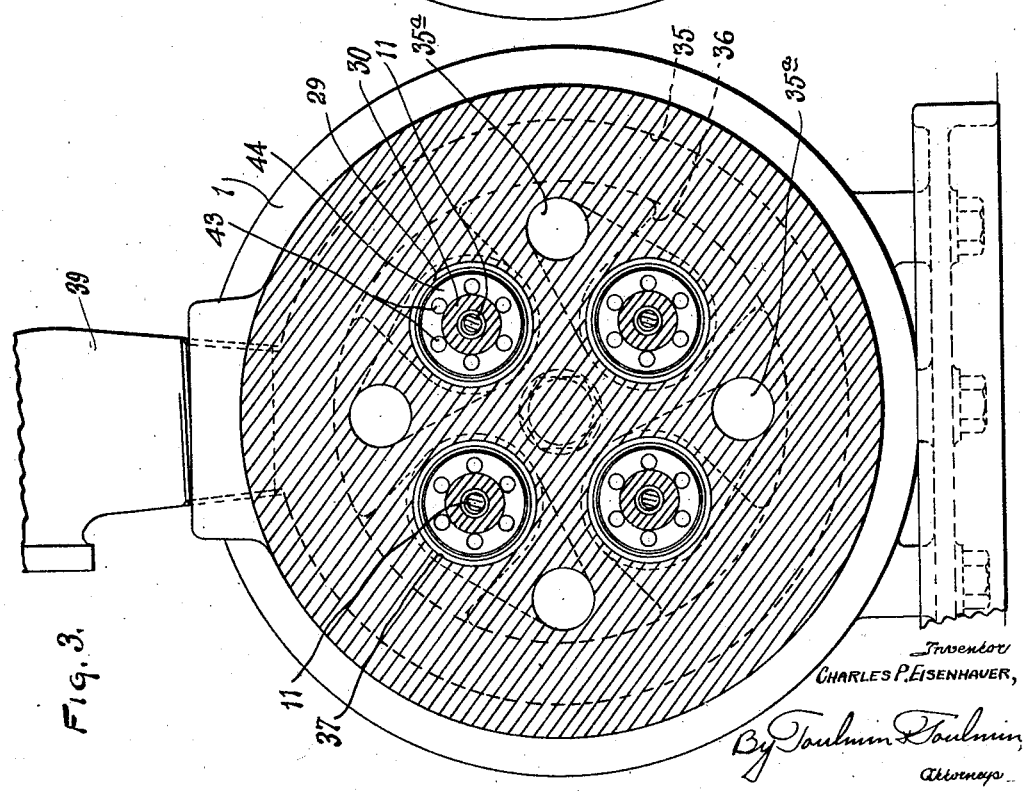
Inventor
CHARLES P. EISENHAUER,
By Toulmin & Toulmin
Attorneys Patented Oct. 15, 1929

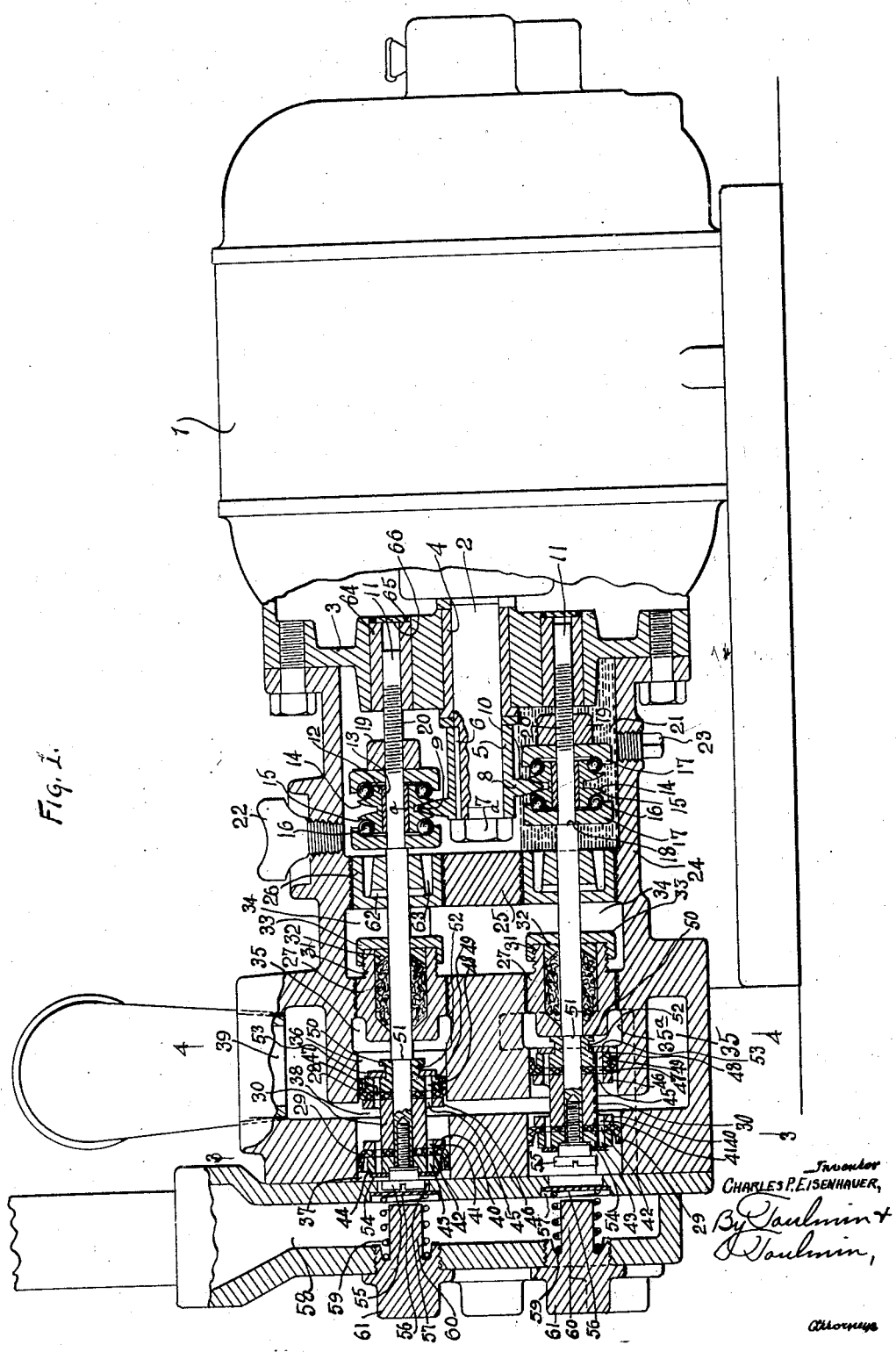

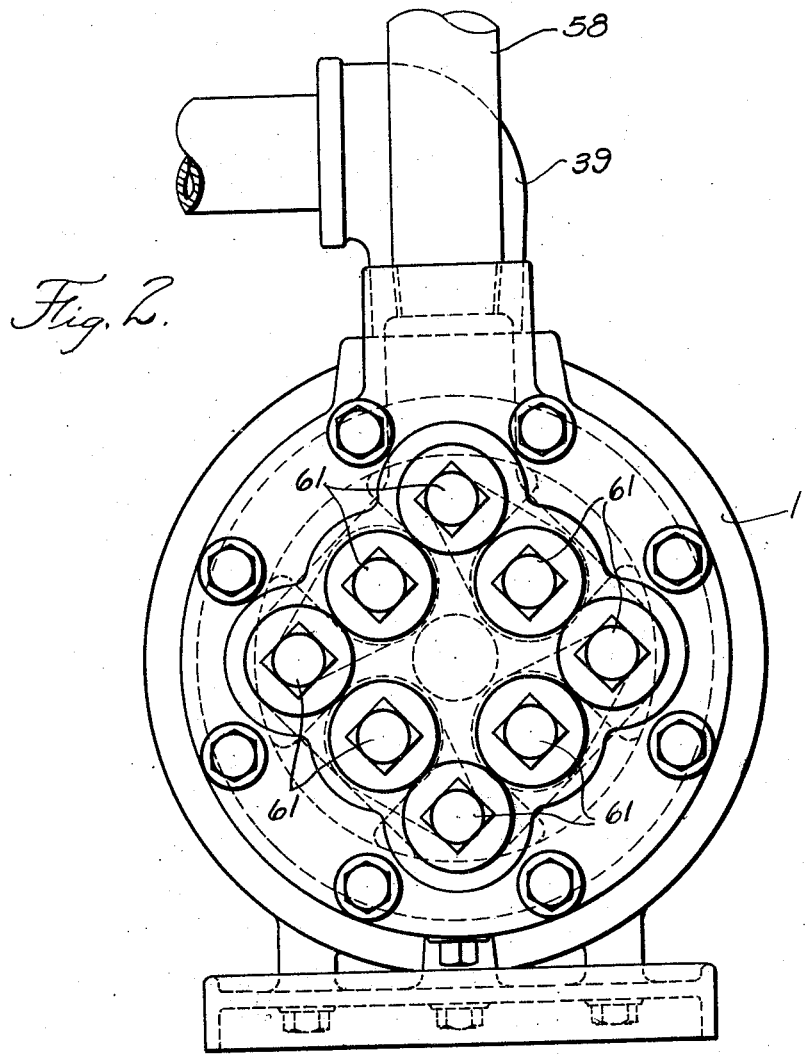

1,731,770

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

PUMP

Application filed December 11, 1926. Serial No. 154,082.

My invention relates to pumps and in particular to the driving means therefor.

It is the object of my invention to provide a means of translating rotary driving movement into reciprocating movement for a plurality of pistons and piston rods and, at the same time, provide a connection between the rotary power element and the reciprocating pumping elements which will produce the minimum of wear and strain upon the driving shaft and the driven piston rods, and which will have the minimum tendency to hold the several shafts out of alignment.

It is my object to provide a double acting reciprocating pump, preferably driven by a rotary member translating its movement to the reciprocating pistons, each piston rod carrying double pistons working in dual cylinders, securing the supply of liquid from a common source and discharging the liquid through separate passageways to a common exit line.

Referring to the drawings:

Figure 1 is a side elevation partially in section showing the arrangement of parts, the section being taken on the line 1—1 of Figure 2;

Figure 2 is an end elevation of the complete pumping apparatus;

Figure 3 is a section on the line 3—3 of Figure 1.

Figure 4 is a section on the line 4—4 of Figure 1.

Referring to the drawings in detail, 1 is an electric motor having an armature shaft 2 supported in the end frame 3 of the motor in the bearing sleeve 4.

Mounted on this armature shaft is a second sleeve 5 retained thereon by a key 6 and a nut 7 on the end of the shaft. On this sleeve, as a part thereof, is formed the flight of a worm 8 having an outer face 9 parallel with the axis of the armature shaft, and side faces beveled, as at 10.

The worm is so arranged in its flight that a line drawn vertically through a section thereof at right angles to the axis of the armature shaft on which it is mounted, such as the line $a$—$a$, is also at right angles to the axis of the piston rod which the surfaces of the worm may be driving through the beveled faced bearing rings carried thereby. There are a pair of spaced bearing rings mounted on the shaft or piston rod 11. Each ring consists of an annular portion 12 mounted on a bearing sleeve 13 carried on the piston rod but loosely mounted thereon. The driving face thereof is beveled as at 14 laterally and outwardly, while the opposite face is formed with a groove 15 extending to about 90 degrees for receiving the balls 16 which are retained thereon by the cage 17 mounted on the piston rod. There are two of these cages, one for each bearing ring and set of balls. One is held by a shoulder 18 on the piston rod and the other by a nut 19 threaded on the piston rod at 20. Thus, the beveled surface of the worm engages the beveled surfaces of the bearing rings and the thrust on the rings is absorbed by the ball bearings provided between the loosely fitting rotating bearing rings and the cage retaining the balls on the rings, which cages are fixed on the piston rod. The squared end of the worm which is parallel to the armature shaft is parallel to the major axis of the piston rod as the piston rod and armature shaft have their major axis parallel to one another.

The parts are lubricated by oil in the chamber 21 which is poured into this chamber when the filler plug 22 is removed, and is drained from this chamber by the drain plugs 23. It is maintained at a level sufficient for the worm to constantly dip in it and carry oil into engagement with the bearing rings and associated bearings.

This chamber is formed by the end wall 3 of the motor and the casing 24 of the pump housing and the partition 25 which is a transverse partition in the pump housing.

The piston rod 11 is supported in a bearing sleeve 26 and a packing sleeve 27 and by the washers 28 and 29 forming piston rings for the piston 30. This packing is held within a sleeve 31 which is closed at one end save for the passageway for the piston rod and open at the other end where it is engaged by the packing ring 32 and knurled ring 33, which holds the packing ring in place and is threaded upon the outside of the sleeve 31, thus forming a tight joint around the piston rod between the chamber 34 and the annular chamber 35. This annular chamber 35 is formed to the rear of the rear half of the cylinder 36. This rear half of the cylinder 36 is separated from the forward half 37 of the cylinder 36 by an annular chamber 38 communicating with the suction line 39.

On the piston rod is mounted a piston 30 which consists of a sleeve having flanges 40 through which are apertures 41 coinciding with an aperture 42 in the washer 29 and an aperture 43 in a retaining ring 44, all on the forward end of the piston. Similar apertures are found in the rear portion of the piston, such as the apertures 45 in the ring 46, the apertures 47 in the washer 28 and the apertures 48 in the retaining ring 49. This retaining ring 49 is provided with an extended sleeve and a second similar ring 50 which abuts against a shoulder 51 on the piston rod. The rings 49 and 50 are spaced to form a groove therebetween 52 for retaining a valve plate 53 which can move backwardly and forwardly between these limiting rings 50 and 49. A similar valve plate 54 is mounted on the forward end of the piston to control the apertures or ports 41, 42 and 43 and is retained in position by the spaced head 55 carried on the end of the piston rod. A third valve plate 56 seals the aperture 57 which has the exhaust port for the discharge line 58. This plate is seated normally by the spring 59 carried on the rotating shaft 60 of the plug 61.

These several cylinders, of which there are any number, but in this embodiment I have shown four, are arranged about the armature driving shaft parallel thereto. It will be understood that, while I have referred to an electric motor and an armature shaft, any form of shaft driven by any source of power will be suitable.

35ª designates a typical exit port from the annular chamber 35 leading to a valve mechanism such as the plate 61, spring 59 and plate 56. It will be understood that there is a valve mechanism of this character and exit port for the chamber 35 for each of the rear pistons of the rear cylinders in the pump. In other words, there will be four of such valve mechanisms for the forward piston and forward cylinders and four of such valve mechanisms for the rear piston and rear cylinder. Therefore, it will be found that the common supply line 39 supplies liquid between the two pistons which is discharged either to the rear through the annular exit line 35 or forwardly into the common discharge line 58.

Thus, each piston rod carries a pair of spaced pistons operating in a separate cylinder separated by a common intake line 39 and discharging eventually into a common discharge line. Each piston rod is, therefore, operating with two pistons in separated cylinders, one of which pistons is constantly forcing liquid from the supply to the delivery line, while the other is allowing liquid to pass through it and accumulate prior to expulsion under compression.

It will be noted that the bearing sleeve 26 is provided with apertures 62 which communicate with an annular passageway 63 within the bearing sleeve adjacent the piston rod so that any oil which may be splashed on the bearing sleeve or which may accumulate on the piston rod will collect in the annular passageway 63 and run back into the oil reservoir 21.

The end of the piston rod which travels in the bearing 64 travels over a groove 65 in the bottom of the bearing. This provides a pressure outlet for any pressure which might be confined between the closed end 66 of the bearing chamber, the end of the piston rod and the walls of the bearing. Thus, it is possible to seal the motor from the chamber 21 and at the same time not set up pressure behind the piston rod which would resist its movement.

It will be understood that I desire to comprehend within my invention such modifications as may be necessary to adapt it to varying conditions and uses.

Having thus fully described my invention, what I claim as new and desire to secure by Letters Patent, is:—

1. In combination, a driving means, a reciprocating means, including rotating bearing rings, spaced pistons, spaced cylinders one behind the other, a supply line connected to said cylinders between said pistons and a common exit line connected to the opposite ends of said cylinders and valve means in said pistons and valve means in said exit line for the respective cylinders and a cam disc for operating the pistons and engaging said bearing rings.

2. In combination, a driving means including rotating bearing rings, a reciprocating means, spaced pistons, spaced cylinders one behind the other, a common supply line connected to said cylinders between said pistons and a common exit line connected to the opposite ends of said cylinders and valve means in said pistons and valve means in said exit line for the respective cylinders, said driving means consisting of a parallel rotating means and disc means thereon adapted to engage with said bearing rings to translate the rotating motion of the driving means into reciprocating motion for the driven means.

3. In combination, a plurality of parallel reciprocating pistons working in spaced cylinders in alignment, a common supply line between said cylinders, a common exit line at either end of said cylinders, valve means in the ports from each of said cylinders to said exit line, valve means on said pistons and piston rods having bearing rings thereon for the respective cylinders whereby as each piston rod operates in one direction, one piston and one cylinder will be accumulating fluid from the common supply line and the other piston and cylinder will be discharging fluid into the common discharge pipe, and means to engage said bearing rings to operate said piston rods.

4. In combination, a plurality of parallel reciprocating pistons working in spaced cylinders in alignment, a common supply line between said cylinders, a common exit line at either end of said cylinders, valve means in the ports from each of said cylinders to said exit line, valve means on said pistons and piston rods having bearing rings thereon for the respective cylinders whereby as each piston rod operates in one direction, one piston and one cylinder will be accumulating fluid from the common supply line and the other piston and cylinder will be discharging fluid into the common discharge line, a rotating driving means common to said piston rods, and disc means engaging said bearing rings for translating its rotating movement into a reciprocating movement of said piston rods in succession.

5. In combination, a plurality of parallel reciprocating pistons working in spaced cylinders, a common supply line between said cylinders, a common exit line at either end of said cylinders, valve means in the ports from each of said cylinders to said exit line, valve means on said pistons and piston rods having bearing rings thereon for the respective cylinders whereby as each piston rod operates in one direction, one piston and one cylinder will be accumulating fluid from the common supply line and the other piston and cylinder will be discharging fluid into the common discharge line, a rotating driving means common to said piston rods, and means for translating its rotating movement into a reciprocating movement of said piston rods in succession, said means consisting of a cam disc on the driving shaft and bearing rings to engage with said cam disc on the driven piston rods.

6. In combination, a driving shaft, a worm thereon, engaging collars on a plurality of parallel piston rods engaging with said worm, a plurality of concentrically located cylinders parallel to said driving shaft, said cylinders being arranged in pairs one behind the other, a common suction line communicating with said cylinders therebetween, a common exit line connected to the rear series of cylinders at one end and the other end to a common exit line for the forward series of cylinders, a common exit line for the forward series of cylinders, valve mechanism for said respective exit ports for the respective cylinders, spaced pistons on said respective piston rods working in the pairs of cylinders, valve mechanism thereon, said pistons having ports therethrough regulated by said valves, and means to seal said piston rods at their rear ends adjacent the rear end of the rear cylinders from the driving mechanism for said piston rods.

7. In combination, a driving shaft, a worm thereon, engaging collars on a plurality of parallel piston rods engaging with said worm, a plurality of concentrically located cylinders parallel to said driving shaft, said cylinders being arranged in pairs one behind the other, a common suction line communicating with said cylinders therebetween, a common exit line connected to the rear series of cylinders at one end and the other end to a common exit line for the forward series of cylinders, a common exit line for the forward series of cylinders, valve mechanism for said respective exit ports for the respective cylinders, spaced pistons on said respective piston rods working in the pairs of cylinders, valve mechanism thereon, said pistons having ports therethrough regulated by said valves, and means to seal said piston rods at their rear ends adjacent the rear end of the rear cylinders from the driving mechanism for said piston rods, said valve mechanism on the pistons consisting of loosely fitting plates adapted to engage with the apertures therein and spaced shoulders on said piston rod for limiting the outward movement of said plates.

8. In combination, a driving shaft, a plurality of parallel piston rods parallel thereto driven thereby, a plurality of concentrically located cylinders arranged in pairs, one behind the other around the axis of said driving means, an annular supply line communicating with the ends of said cylinders, an annular exit line communicating with the ends of one series of said cylinders, a second annular exit line connected to the other ends of the other cylinders, exit ports communicating from the first exit line to the second exit line, removable valve mechanism controlling said exit ports, of the first and second series of cylinders into the second exit line, said members being located on the end of said structure and pistons on said piston rods arranged in pairs working in the paired cylinders alternately comprising valve mechanisms on said respective pistons and cam disc means for operating the piston rods.

9. In combination, an electric motor having an armature shaft, a base therefor adapted to support it and a pump housing, a pump housing mounted on said motor and sealed therefrom consisting of a driving chamber adapted to contain lubricant, a stuffing box chamber sealed from the driving chamber, an annular exit chamber, an annular intake chamber, a second annular exit chamber, there being ports communicating between the two exit chambers and ports from the plurality of cylinders into the second exit chamber, valve mechanism for controlling said ports, a plurality of cylinders arranged around said armature shaft in pairs, piston rods working therein, pistons arranged in spaced pairs working therein, valve mechanism on said pistons and means on said motor armature shaft for engaging with said piston to translate the rotating movement of the armature shaft into the reciprocating movement of the piston rods.

In testimony whereof, I affix my signature.

CHARLES P. EISENHAUER.